US010083392B2

(12) United States Patent
Lowe (10) Patent No.: US 10,083,392 B2
(45) Date of Patent: Sep. 25, 2018

(54) CONTACTLESS BIOMETRIC IDENTIFICATION DEVICE ALLOWING MULTIPLE CONFIGURATIONS (71) Applicant: ZWIPE AS, Oslo (NO)

(72) Inventor: Peter Robert Lowe, Peyton, CO (US)

(73) Assignee: ZWIPE AS, Oslo (NO)

( * ) Notice: Subject to any disclaimer, the term of this patent is extended or adjusted under 35 U.S.C. 154(b) by 0 days.

(21) Appl. No.: 15/517,984

(22) PCT Filed: Oct. 12, 2015

(86) PCT No.: PCT/EP2015/073535
§ 371 (c)(1),
(2) Date: Apr. 10, 2017

(87) PCT Pub. No.: WO2016/055660
PCT Pub. Date: Apr. 14, 2016

(65) Prior Publication Data
US 2017/0308786 A1 Oct. 26, 2017

Related U.S. Application Data (60) Provisional application No. 62/062,267, filed on Oct. 10, 2014.

(30) Foreign Application Priority Data

May 14, 2015 (GB) .................................. 1508296.9

(51) Int. Cl.
G06K 19/07 (2006.01)
G06K 19/077 (2006.01)
G06K 9/00 (2006.01)

(52) U.S. Cl.
CPC ... *G06K 19/07773* (2013.01); *G06K 9/00006* (2013.01); *G06K 19/0718* (2013.01); *G06K 19/0723* (2013.01); *G06K 19/07718* (2013.01)

(58) Field of Classification Search
None
See application file for complete search history.

(56) References Cited

U.S. PATENT DOCUMENTS 6,617,962 B1 * 9/2003 Horwitz ............... G06K 7/0008
340/10.4
7,132,946 B2 * 11/2006 Waldner ............. G06K 19/0707
340/572.1

(Continued)

FOREIGN PATENT DOCUMENTS

EP 1074949 A1 2/2001
WO 2013160011 A1 10/2013
WO 2014043445 A2 3/2014

OTHER PUBLICATIONS

International Search Report for corresponding application PCT/EP2015/073535 filedOct. 12, 2015; dated Jan. 21, 2016.

(Continued)

Primary Examiner — Christle I Marshall
(74) Attorney, Agent, or Firm — Cantor Colburn LLP (57) ABSTRACT A method of manufacturing biometric RFID devices includes producing a plurality of identical biometric identification devices that are each adapted to receive at least two different types of RFID module, and installing a respective RFID module into each of the devices corresponding to a selected RFID protocol.

21 Claims, 5 Drawing Sheets (56) References Cited

U.S. PATENT DOCUMENTS

| | | | |
|---|---|---|---|
| 7,278,025 B2 | 10/2007 | Saito | |
| 8,373,540 B2 * | 2/2013 | Solomon | G06Q 10/087 340/5.52 |
| 8,875,996 B2 * | 11/2014 | Mestres | G06K 19/07354 235/380 |
| 8,947,214 B2 * | 2/2015 | Solomon | G05B 1/01 340/286.11 |
| 9,281,873 B2 * | 3/2016 | Kato | G06K 7/0008 |
| 9,436,816 B2 * | 9/2016 | Nice | G06F 21/32 |
| 2005/0231331 A1 * | 10/2005 | Kang | G06K 7/0008 340/10.51 |
| 2006/0255127 A1 | 11/2006 | Woods | |
| 2007/0265964 A1 | 11/2007 | Berardi | |
| 2008/0084310 A1 * | 4/2008 | Nikitin | G06K 7/0008 340/572.7 |
| 2011/0043338 A1 * | 2/2011 | Kato | G06K 7/0008 340/10.1 |
| 2015/0294295 A1 * | 10/2015 | Colby | G06Q 20/4012 705/72 |

OTHER PUBLICATIONS

Written Opinion for corresponding application PCT/EP2015/073535 filedOct. 12, 2015; dated Jan. 21, 2016.
British Search Report for corresponding application GB1508296.9; Report dated Oct. 28, 2015.

* cited by examiner

FIG. 5

CONTACTLESS BIOMETRIC IDENTIFICATION DEVICE ALLOWING MULTIPLE CONFIGURATIONS

TECHNICAL FIELD

The present invention relates to a contactless biometric identification device, and particularly to a contactless biometric identification device allowing multiple configurations for communication using different RFID protocols.

BACKGROUND

Figure 1:
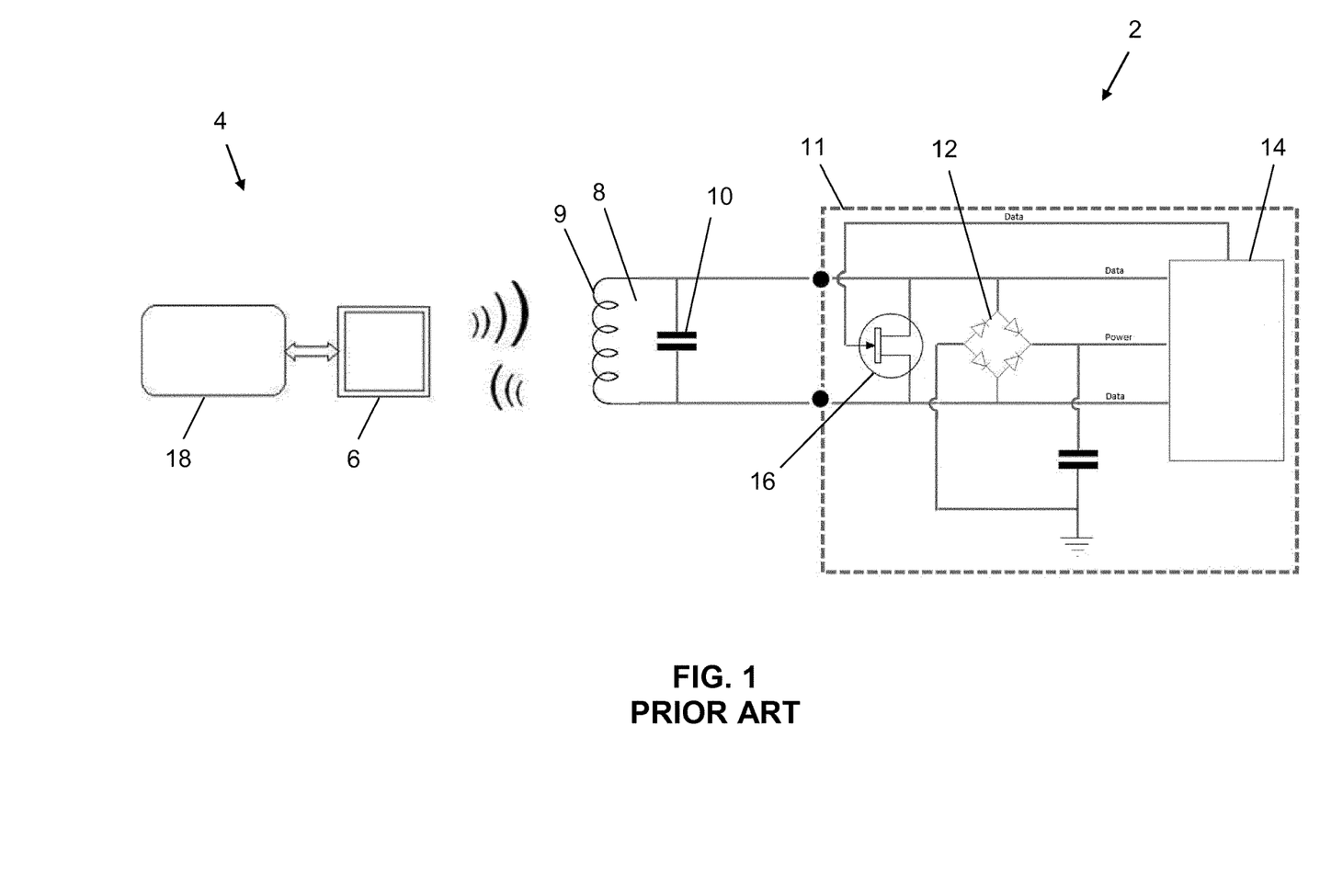
FIG. 1 illustrates a circuit for a prior art passive RFID device.

FIG. 1 shows the architecture of a typical passive RFID device 2. A powered RFID reader 4 transmits a signal via an antenna 6. The signal is typically at 13.56 MHz for MIFARE® and DESFire® systems, manufactured by NXP Semiconductors, but may be at 125 kHz for lower frequency PROX® products, manufactured by HID Global Corp. This signal is received by an antenna 8 of the RFID device 2, comprising a tuned coil 9 and a capacitor 10, and then passed to an RFID chip 11. The received signal is rectified by a bridge rectifier 12, and the DC output of the rectifier 12 is provided to control logic 14 that controls the messaging from the chip 11.

Data output from the control logic 14 is connected to a field effect transistor 16 that is connected across the antenna 8. By switching on and off the transistor 16, a signal can be transmitted by the RFID device 2 and decoded by suitable control circuits 18 in the reader 4. This type of signaling is known as backscatter modulation and is characterized by the fact that the reader 4 is used to power the return message to itself.

It has been proposed to incorporate a biometric sensor, such a fingerprint scanner, into a passive or semi-passive RFID device. It is desirable to produce biometric RFID devices that are compatible with various RFID protocols. However, there are many different types of RFID protocol, each using, for example, different frequencies, different number of bits, different modulation schemes, different data protection schemes, etc.

One exemplary RFID protocol is the HID Global Corp. proximity protocol, which uses a 125 kHz excitation field, FSK keying, up to 37 bits of data, no data protection and a frame length denoted by a Manchester code violation. Another common protocol is defined in international standard ISO/IEC 14443A, which uses a 13.56 MHz excitation field, but devices complying with this protocol may exist in several types with different memory size, data protection etc. These devices are sold under the name MIFARE®.

In order to use a specific protocol, the RFID device requires an RFID chip corresponding to that protocol; however, it is not practical to design a single device capable of complying with all the desired RFID protocols at once. Furthermore, the RFID chips are not standardized, and therefore a unique RFID device design must be produced for use with each protocol. This increases the cost of manufacture due to changeover costs between different designs. Furthermore, it increases the risk of over- or under-production of RFID devices complying with each of the various protocols, which can lead to delays in supply or to wastage.

BRIEF SUMMARY

Viewed from a first aspect, the present invention provides a method of manufacturing biometric RFID devices, the method comprising: producing a plurality of biometric identification devices that are each adapted to receive an RFID module comprising an RFID chip and a tuning capacitor, each biometric identification device comprising: a device body housing a biometric authentication engine; an antenna within the device body; and a socket arranged to receive an RFID module; the method further comprising: for each biometric identification device, selecting an RFID protocol from a plurality of different RFID protocols; and installing, in the socket of the biometric identification device, an RFID module corresponding to the selected RFID protocol.

An "RFID module" is a product manufactured to comply with a particular RFID protocol. RFID modules include an RFID chip together with a tuning capacitor, such that they simply need to be connected to an appropriate antenna to operate. Many RFID modules are commercially available only from certain manufacturers and are not standardized, so different modules require different connections and different antennae to be used.

In accordance with the invention, a generic biometric identification device can be mass produced that allows different RFID modules to be installed, after manufacture of the basic device, depending on the intended application of the biometric identification device. The step of selecting the RFID protocol may involve selecting different protocols for different devices and hence the method may include installing different modules for different devices in the plurality of devices. This allows for a single device design to be mass produced and used for applications using different RFID protocols, reducing costs during the manufacturing process, as only one design needs to made, and improving the flexibility of the stock, as the same unit can be used for all protocols rather than having the risk to too much of one design and too few of another.

The step of selecting the RFID protocol may advantageously be performed after the step of producing the corresponding biometric identification device. Conversely, in the prior art, such a decision would need to be made before commencing manufacture of the device, as each RFID module would need a custom device configuration.

In one example embodiment, the method comprises selecting a first RFID protocol from the plurality of different RFID protocols for a first biometric identification device and installing a corresponding RFID module in the first biometric identification device; and selecting a second RFID protocol from the plurality of different RFID protocols for a second biometric device, the second RFID protocol being different from the first RFID protocol, and installing a corresponding RFID module, in the second biometric identification device.

Thus, the basic biometric devices can be manufactured in large quantity and used with multiple different RFID modules. Indeed, preferably all of the biometric identification devices are structurally identical before installation of an RFID module. It will be appreciated that the method does not require the RFID protocol to be changed for each device. Indeed, it may be required to produce a first set of devices with a first protocol, for example to satisfy a first order from a customer, and to then produce a second set of devices using a second protocol, for example to satisfy a second order. What is important for the current method is that there is the capability to switch between protocols whilst not changing the basic design of the biometric identification device.

Preferably, each biometric identification device includes multiple sets of terminals in the socket, with each set of terminals being arranged for operation with a different type of RFID module. Thus, there may be a first set of terminals in the socket for operation with a first RFID module and a second different set of terminals for operation with a second RFID module. The different sets of terminals may be located within the socket so as to receive different types of RFID modules.

In some embodiments, the biometric identification device may be adapted to be operable at multiple frequencies. Thus, the first RFID protocol may operate at a first frequency and the second RFID protocol operates at a second frequency, the second frequency being different from the first frequency.

Furthermore, where the first frequency is higher than the second frequency, the biometric authentication engine may be configured to activate an RFID module connected to the first set of terminals using a switch coupled in series with the antenna, and to active an RFID module connected to the second set of terminals using a switch coupled in parallel with the antenna.

The switch may be, for example, a solid state relay. A typical solid state relay, however, is not a perfect switch, but in fact has a parasitic parallel capacitance and a parasitic series resistance, which makes the application of the solid state relay as a switch imperfect.

When the switch is in series with the antenna coil, the parasitic series resistance causes signal degradation. However, when the switch is in parallel with the antenna coil, the parasitic parallel capacitance causes detuning of the antenna. It has been found that the parallel parasitic capacitance of a typical solid state relay switch will detune a relatively high-frequency antenna (such as a 13.56 MHz antenna) to an unacceptable extent when the switch is open and in parallel with the antenna. However, a relative low-frequency antenna (such as 125 kHz) is less severely affected by the parasitic capacitance of the switch. Accordingly, a parallel arrangement is optimal for use with a low-frequency RFID module in order to minimize signal degradation by the parasitic resistance, whereas the series arrangement is optimal for use with a high-frequency RFID module so as not to detune the antenna.

In one arrangement, as mentioned above, the first RFID protocol may operate at 13.56 MHz and the second RFID protocol may operate at 125 kHz.

Preferably, the biometric device is passive or semi-passive. That is to say, the biometric identification device does not include a battery configured to power an RFID module installed in the socket. In one embodiment, the biometric device is a (fully) passive device, i.e. it does not include a battery at all.

In one example, the biometric authentication engine is a fingerprint authentication engine.

Viewed from a second aspect, the present invention provides a biometric identification device for receiving an RFID module comprising an RFID chip and a tuning capacitor, the biometric identification device comprising: a device body housing a biometric authentication engine; an antenna within the device body; and a socket arranged to receive an RFID module, the socket including terminals adapted to receive either a first type of RFID module complying with a first RFID protocol or alternatively to receive a second type of RFID module complying with a second RFID protocol, the second RFID protocol being different from the first RFID protocol.

As discussed above, such biometric identification devices can be mass produced to take advantage of the economies of scale. After manufacture, an appropriate RFID module can be installed to cause the device to operate in accordance with a required RFID protocol. There may be, in one example embodiment, a set of biometric identification devices, each device being as described above, whereby individual devices from the set of devices may be fitted with different types of RFID modules. In another example there may be a set of biometric identification devices comprising multiple identical biometric identification devices with one group of the devices being fitted with a first type of RFID module and another group of the devices being fitted with a second type of RFID module.

The biometric identification device may comprise a switch controllable by the biometric authentication engine for activating an RFID module when connected to the terminals. The switch may be arranged in series with the antenna, or in parallel with the antenna.

Alternatively, or in addition, the terminals may include at least a first set of terminals and a second set of terminals within the socket, the first set of terminal being arranged to receive the first type of RFID module, and the second set of terminal having a different configuration to the first set of terminals and being arranged to receive a second type of RFID module.

The biometric identification device may then further comprise: a first switch arranged in series with the antenna and controllable by the biometric authentication engine for activating a first type RFID module, when connected to the first set of terminals; and a second switch arranged in parallel with the antenna and controllable by the biometric authentication engine for activating a second type RFID module, when connected to the second set of terminals.

The biometric authentication engine is preferably configured to verify the identity of a user and responsive to a positive identification, cause an RFID module connected to the terminals to transmit a message using the antenna. This may be done, for example, by opening or closing a switch to activate the RFID module.

In one preferred embodiment, the biometric authentication engine is a fingerprint authentication engine.

The RFID device(s) may be any one of: an access card, a credit card, a debit card, a pre-pay card, a loyalty card, an identity card, a cryptographic card, or the like.

BRIEF DESCRIPTION OF THE DRAWINGS

Certain preferred embodiments of the present invention will now be described in greater detail, by way of example only, and with reference to the accompanying drawings, in which.

DETAILED DESCRIPTION

Figure 2:
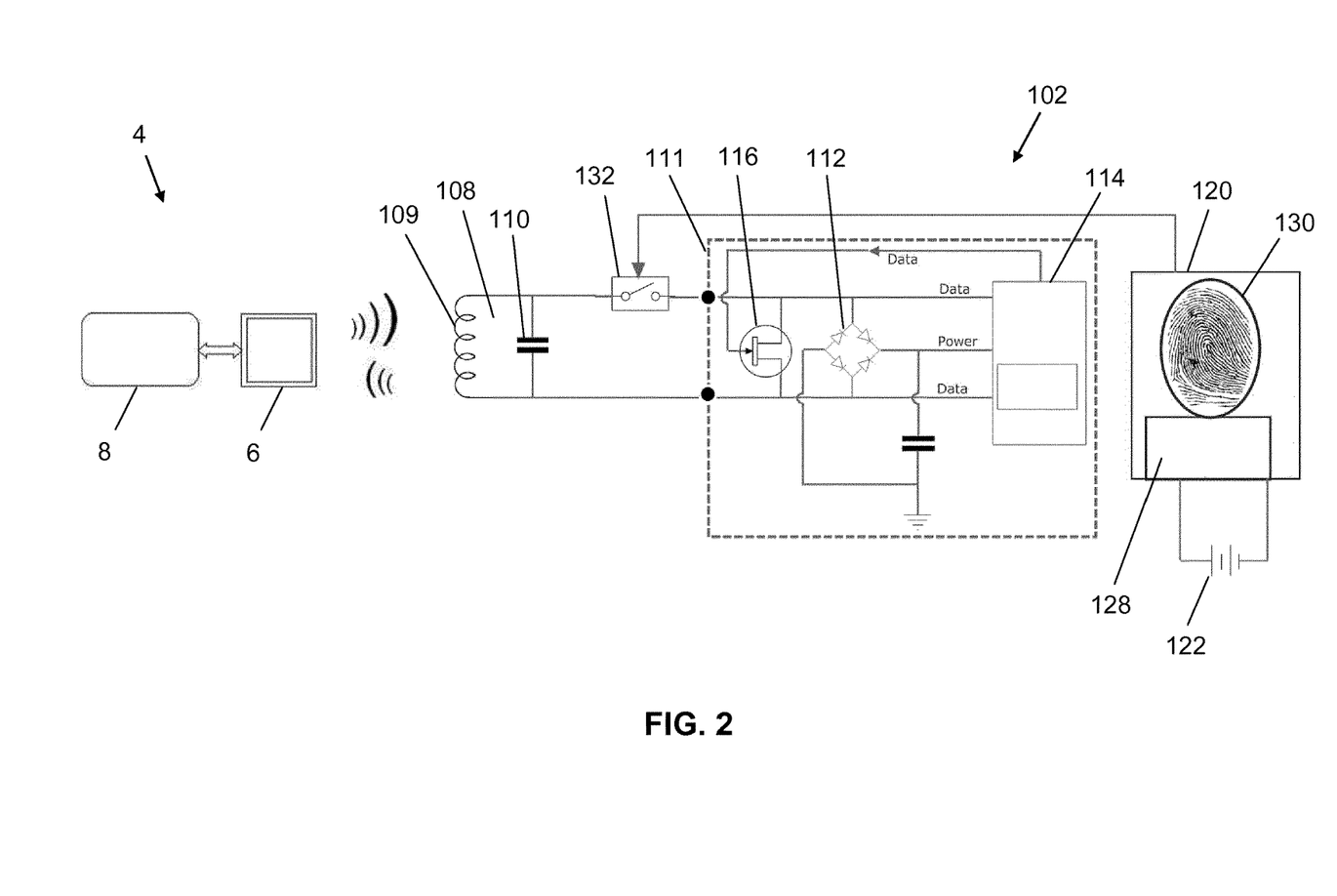
FIG. 2 illustrates a circuit for a semi-passive RFID biometric identification device incorporating a fingerprint scanner.

FIG. 2 shows the architecture of an RFID reader 4 and a semi-passive RFID device 102, which is a variation of the prior art passive RFID device 2 shown in FIG. 1. The RFID device 102 shown in FIG. 2 has been adapted to include a fingerprint authentication engine 120.

As used herein, the term "passive RFID device" should be understood to mean an RFID device 102 in which the RFID chip 110 is powered only by energy harvested from an RF excitation field, for example generated by the RFID reader 118. That is to say, a passive RFID device 102 relies on the RFID reader 118 to supply its power for broadcasting. A passive RFID device 102 would not normally include a battery, although a battery may be included to power auxiliary components of the circuit (but not to broadcast), such as the fingerprint authentication engine 120; such devices are referred to as "semi-passive RFID devices".

The RFID reader 4 is a conventional RFID reader operating as in FIG. 1. The RFID reader 4 is configured to generate an RF excitation field using a reader antenna 6. The reader antenna 6 further receives incoming RF signals from the RFID device 102, which are decoded by control circuits 18 within the RFID reader 4.

The RFID device 102 comprises an antenna 108 for receiving an RF (radio-frequency) signal, a passive RFID chip 111 powered by the antenna 108, and a powered fingerprint authentication engine 120 powered by a battery 122.

The antenna 108 comprises a tuned circuit, in this arrangement including an antenna coil 109 and a tuning capacitor 110, tuned to receive an RF signal from the RFID reader 104. The antenna 108 is tuned to receive a frequency corresponding to an RFID protocol of an RFID chip 111 of the device 102. When exposed to the excitation field generated by the RFID reader 4, a voltage is induced across the antenna 108.

The output lines of the antenna 108 are connected to the RFID chip 111 via a control switch 132, which is controlled by the fingerprint authentication device 120.

The fingerprint authentication device 120 includes a processing unit 128 and a fingerprint reader 130. The fingerprint authentication device 120 is arranged to scan a finger or thumb presented to the fingerprint reader 130 and to compare the scanned fingerprint of the finger or thumb to pre-stored fingerprint data using the processing unit 128. A determination is then made as to whether the scanned fingerprint matches the pre-stored fingerprint data.

If a match is determined, then the RFID chip 110 is authorized to transmit a signal to the RFID reader 104. In the FIG. 2 arrangement, this is achieved by closing the control switch 132 to connect the RFID chip 110 to the antenna 108. The RFID chip 111 is conventional and operates in the same manner as the RFID chip 10 shown in FIG. 1 to broadcast a signal via the antenna 108 using backscatter modulation by switch on and off a transistor 116.

In this arrangement, the inductance and capacitance of the antenna coil 109 and tuning capacitor 110 are selected specifically to operate at the frequency of the protocol defined by the RFID chip 111.

Figure 3:
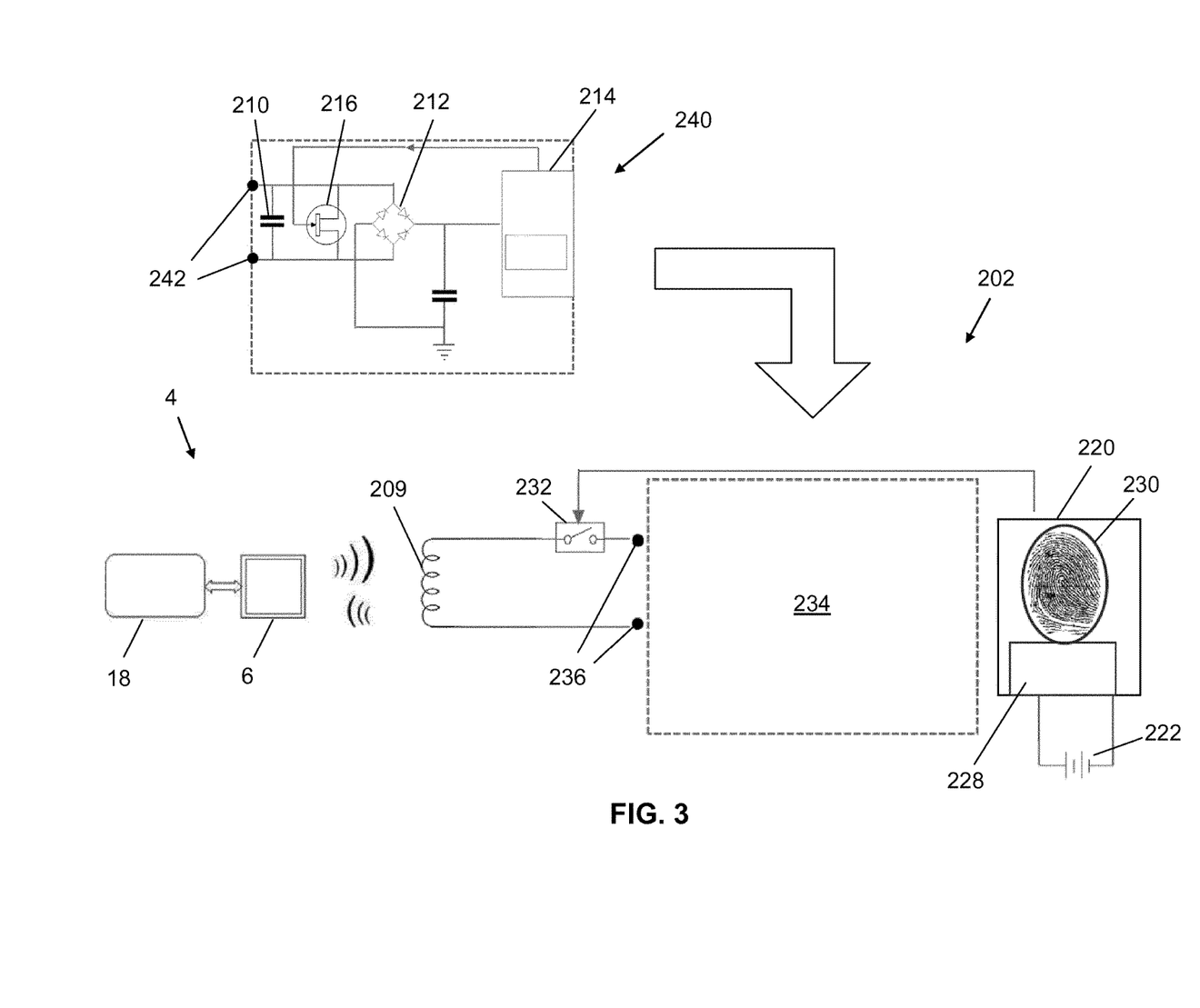
FIG. 3 illustrates a circuit for a semi-passive biometric identification device having a socket for receiving high-frequency RFID modules of different types.

FIG. 3 shows the architecture of an RFID reader 4 and a semi-passive biometric RFID device, which is a variation of the semi-passive RFID device 2 shown in FIG. 2.

The biometric RFID device shown in FIG. 3 operates similarly to the RFID device 102 shown in FIG. 2 and components corresponding to those shown in FIG. 2 share the same reference numeral, incremented by 100. To avoid repetition, only the differences between these arrangements will be discussed below. The discussion of the components shown in FIG. 2 otherwise applies also to the corresponding components shown in FIG. 3.

The biometric RFID device shown in FIG. 3 comprises two parts, a biometric device 202 and an RFID module 240. The biometric device 202 is compatible with multiple RFID modules 240, each complying with a different RFID protocol. The biometric device 202 and the RFID module 240 may be separately manufactured, for example each RFID modules may be manufactured by a proprietor of the particular RFID protocol. When the RFID module 240 is installed in the biometric device 202, a complete biometric RFID device is formed, which operates similarly to the RFID device 102 show in FIG. 2, but in accordance with the RFID protocol of the selected RFID module 240.

An RFID module 240 comprises an RFID chip configured to operate in accordance with a particular RFID protocol and a tuning capacitor 210 sized to tune an antenna coil 209 of the biometric device 202 to receive an RF signal at the operating frequency of the RFID protocol.

RFID modules 240 are often commercially available and manufactured by a proprietor of the particular RFID protocol. In some cases, RFID modules 240 may be sold together with an antenna, which must be removed before it can be used with the biometric device 202. Alternatively, an RFID module 240 can be created by mounting an RFID chip to a board together with a suitable tuning capacitor 210.

The RFID chip of the RFID module 240 comprises the components required to transmit a return signal to the RFID reader 204 in accordance with a particular RFID protocol. This typically includes control logic 214 and a switch 216 for connection across the antenna 208 to transmit a signal via backscatter modulation. The RFID chip may also comprise a rectifier 212 to rectify a received voltage to power the control logic 214. The RFID chip may, in some embodiments, be a self-contained component as in FIG. 1 or FIG. 2.

The RFID module 240 includes a pair of terminals 242 (although other terminal configurations are possible) for connection to the biometric device 202. These terminals 242 are arranged so as to be connected across the ends of an antenna coil 209, such that when the antenna coil 209 is connected across the terminals, the RFID chip can transmit a signal via the antenna coil 209, which is tuned by the tuning capacitor 210.

The biometric device 202 comprises a housing (not shown) within which is provided: an antenna coil 209; a biometric authentication engine 220, such as the fingerprint authentication engine shown; a socket 236 for receiving an RFID module 240; and a control device 232 controllable by the biometric authentication engine 220 for activating the RFID module 240, when installed in the socket 236.

The socket 236 essentially comprises a space within the housing sufficiently large so as to accommodate the largest expected RFID module 240. The socket 236 includes terminals 236 arranged so as to engage with the corresponding terminals 242 of an RFID module 240. The socket 236 may include multiple different sets of terminals 236, each being positioned to engage with the terminals 242 of a corresponding RFID module 240 when installed in the socket 236. In order to simplify construction, each set of terminals preferably comprises a pair of terminals to connect the RFID module 240 across the antenna coil 240, although one of the pair of terminals may be shared between different sets of terminals.

The control device 232 in this embodiment comprises a switch 232, such as a solid state relay 232, connected in series with the antenna coil 209. The switch 232 is controlled by the biometric authentication engine 220. When the biometric authentication engine 220 determines an acceptance condition, such as a matched fingerprint, the switch 232 is controlled to activate the RFID chip of the RFID module 240. In this embodiment, this is achieved by closing the switch 232 to supply the signal from the antenna coil 209 to the terminals 236 of the socket 234.

Figure 4:
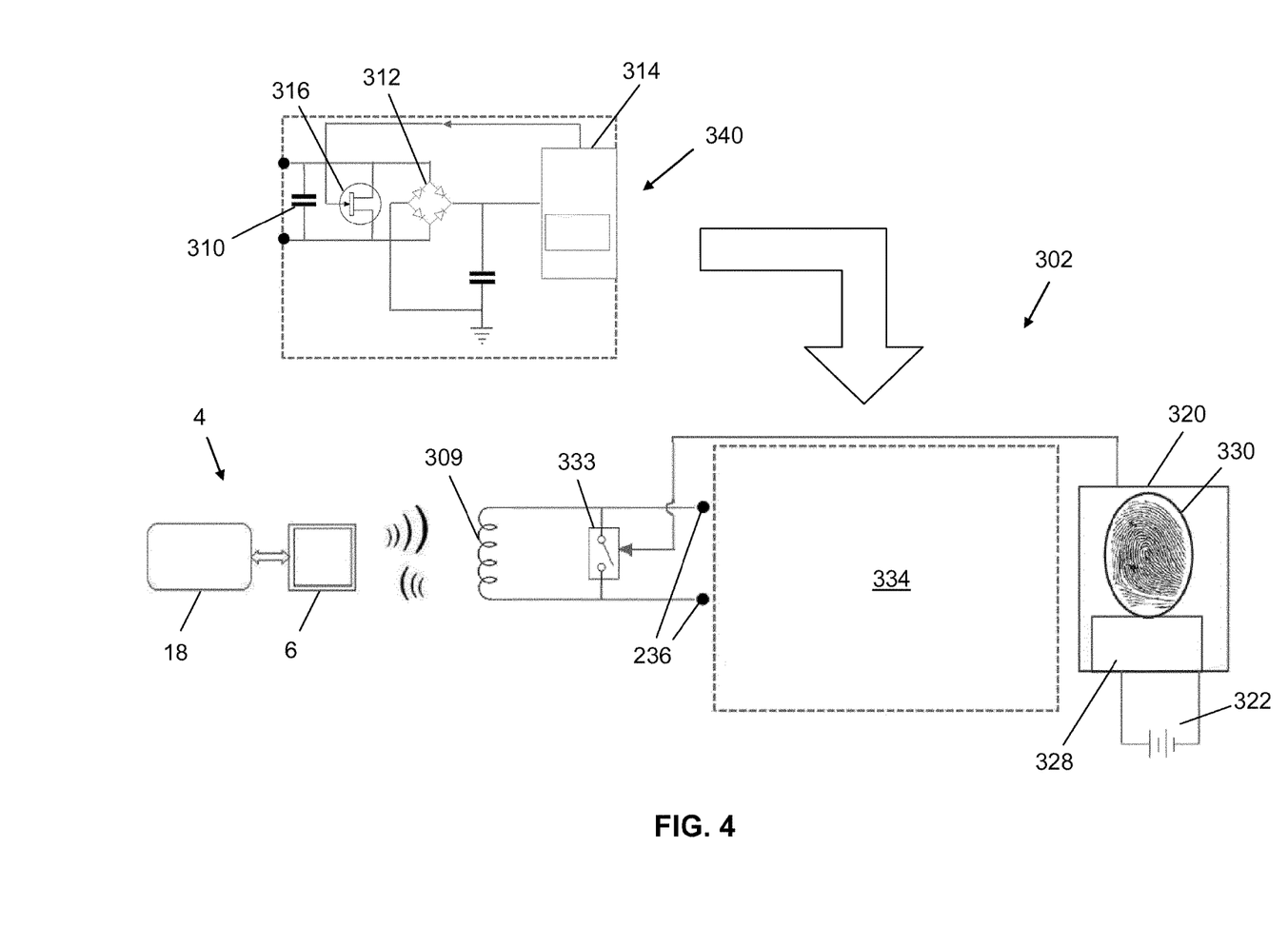
FIG. 4 illustrates a circuit for a semi-passive biometric identification device having a socket for receiving low-frequency RFID modules of different types

FIG. 4 shows the architecture of an RFID reader 4 and an alternative semi-passive biometric RFID device, which is a variation of the semi-passive RFID device shown in FIG. 3.

The biometric RFID device shown in FIG. 4 is similar to that shown in FIG. 3, and components corresponding to those shown in FIG. 3 share the same reference numeral, incremented by 100. To avoid repetition, only the differences between these arrangements will be discussed below. The discussion of the components shown in FIG. 3 otherwise applies also to the corresponding components shown in FIG. 4.

The main difference between the biometric device 302 shown in FIG. 4 and the biometric device 202 shown in FIG. 3 is the arrangement of the control device 333.

The control device 333 in this embodiment comprises a switch 333, such as a solid state relay 333, connected in parallel with the antenna coil 309. The switch 333 is controlled by the biometric authentication engine 320. When the biometric authentication engine 320 determines an acceptance condition, such as a matched fingerprint, the switch is controlled to activate the RFID chip of the RFID module 340. In this embodiment, when the switch 333 is closed, the antenna coil 309 is short circuited and the RFID module 340 does not receive any power. In order to activate the RFID module 340, the switch 333 is the opened, responsive to a command from the biometric authentication engine 320, to activate the RFID module 340.

A typical solid state relay 232, 333 is not a perfect switch, but in fact has a parasitic parallel capacitance and a parasitic series resistance, which make the application of the solid state relay 232, 333 as a switch imperfect. That is to say, a solid state relay 232, 333 acts as a resistor when closed and a capacitor when open.

In the FIG. 3 arrangement, when the switch 232 is open, the RFID module 240 is not activated and so the parasitic capacitance of the switch 232 is not significant. However, when the switch 232 is closed, the RFID module 240 is activated and the received signal passes through the switch 232. Thus, the parasitic resistance of switch 232 affects the signal processed by the RFID module 240. This parasitic resistance can significantly degrade the signal and so is ideally avoided.

In the FIG. 4 arrangement, this signal degradation is avoided because, when the switch 333 is closed, the RFID module 340 is not activated, and, when the switch 333 is open, the signal is not passed through the switch 333. Thus, the parasitic resistance does not degrade the signal. However, when the switch 333 is open, the parasitic capacitance of the switch 333 is in parallel with the tuning capacitor 310, which can detune the antenna 308.

Analysis shows that the parallel parasitic capacitance of a typical solid state relay switch 333 in parallel with the antenna coil 308 will detune a relatively high-frequency antenna 308 (such as a 13.56 MHz antenna) to an unacceptable extent when the switch 333 is open. However, a low-frequency RFID module 340 has relatively low impedance and so is less severely affected by the parasitic capacitance of the switch 333.

Accordingly, the arrangement shown in FIG. 4 is optimal for use with a low-frequency RFID module 240 in order to minimize signal degradation by the parasitic resistance, whereas the arrangement shown in FIG. 3 is optimal for use with a high-frequency RFID module 340 so as not to detune the antenna 208.

In order to further reduce manufacturing costs, it is desirable to produce a biometric device having a single design that is capable of being used for both high-frequency and low-frequency RFID modules.

Figure 5:
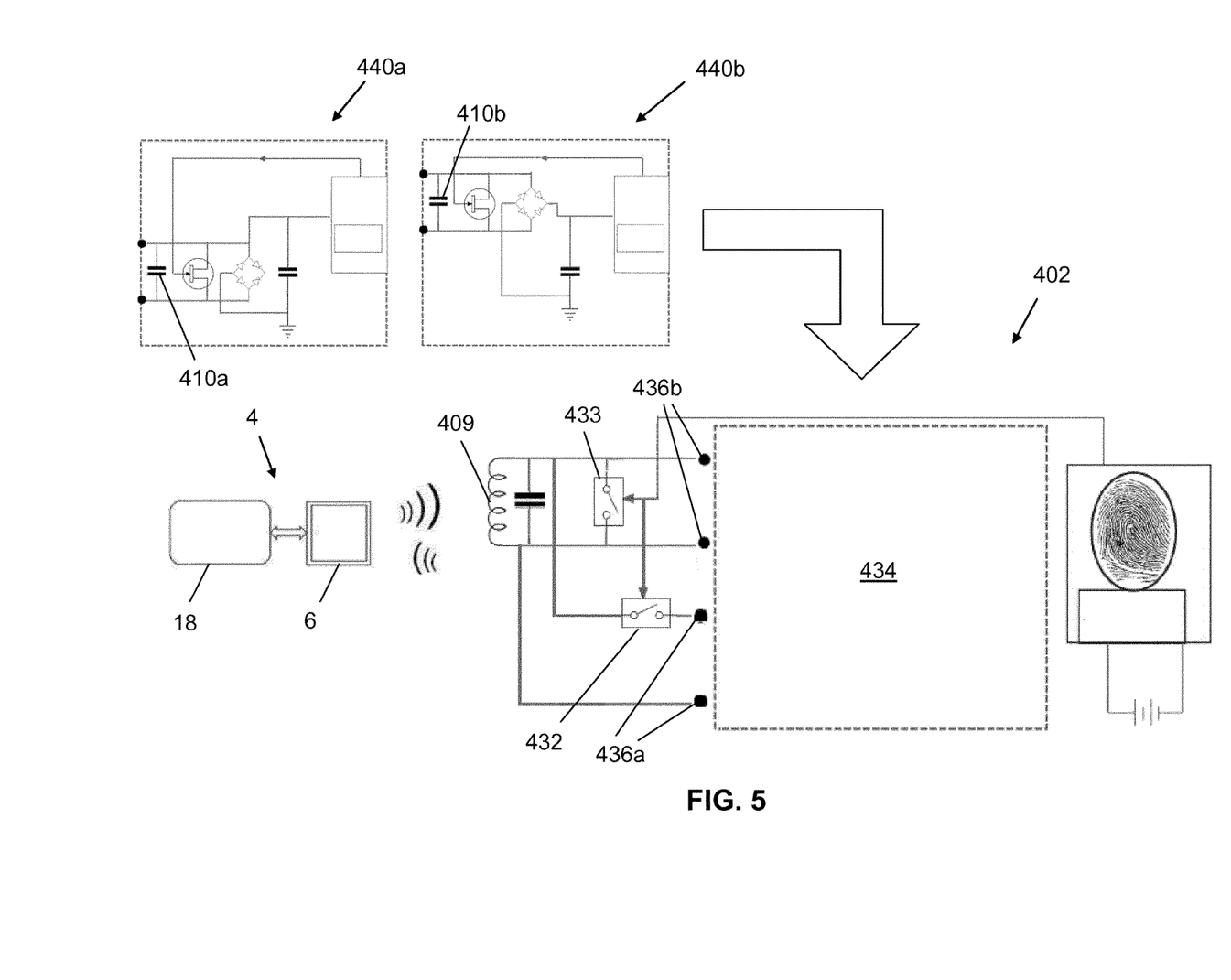
FIG. 5 illustrates a circuit for a semi-passive biometric identification device having a socket for receiving both low-frequency and high-frequency RFID modules of different types.

FIG. 5 shows the architecture of an RFID reader 4 and yet another alternative semi-passive biometric RFID device, which is a variation of the semi-passive RFID devices shown in FIGS. 3 and 4.

The biometric RFID device shown in FIG. 5 combines elements of those shown in FIGS. 3 and 4, and components corresponding to those shown in FIG. 3 or 4 share the same reference numeral, incremented by 200 or 100, respectively. To avoid repetition, only the differences between these arrangements will be discussed below. The discussions of the components shown in FIGS. 3 and 4 otherwise apply also to the corresponding components shown in FIG. 5.

In this arrangement, the socket 434 of the biometric device 402 has two alternative pairs of terminals 434a, 434b. The biometric device 402 further comprises first and second switches 432, 433. The first switch 432 is connected in series with the antenna coil 409 and the first set of terminals 436a. The second switch is connected in parallel with the antenna coil 409 and the second set of terminals 436b.

The first and second sets of terminals 436a, 436b are arranged differently within the socket for connection, such that an RFID device 440 can be connected to one or other sets of terminals. For example, in this embodiment, the sets of terminals 436a, 436b are axially offset from one another along the edge of the socket 434, although other arrangements are possible depending upon the configuration of the RFID modules 440.

As can be seen, when a high-frequency RFID module 440a, operating for example at 13.56 MHz, is installed in the socket 434, the terminals of the RFID module 440a connect with the first set of terminals 436a such that the tuning capacitor 410a of the RFID module 440a is connected with the switch 432 in series with the antenna coil 409. This configuration corresponds to the configuration shown in FIG. 3.

Conversely, when a low-frequency RFID module 440b, operating for example at 125 kHz, is installed in the socket 434, the terminals of the RFID module 440b connect with the second set of terminals 436b such that the RFID module 440b is connected with the switch 433 in parallel with the antenna coil 409. This configuration corresponds to the configuration shown in FIG. 4.

The frequency at which the resulting biometric RFID device will operate is defined by the inductance of the antenna coil 409 and the capacitance of the tuning capacitor 410a, 410b, which is selected to cause the antenna 408 to be excited by an RF field at a frequency dictated by the RFID protocol of the RFID chip of the RFID module 440a, 440b installed.

Accordingly, a single biometric device design can be used with multiple RFID protocols, which also has a switching arrangement providing optimal signal to the RFID chip of the installed RFID module 440.

A method of manufacturing a biometric RFID device comprises producing a plurality of biometric devices 202, 302, 402 as shown in any of FIG. 3, 4 or 5. After the biometric devices 202, 302, 402 have been produced, they can be stored until an order is made for a biometric RFID device complying with a particular protocol. In response to this order, a suitable RFID module 240, 340, 440a, 440b is selected and installed into the socket 234, 334, 344 of the biometric device 202, 302, 402.

When installing the RFID module 240, 340, 440a, 440b, various further modification may be made. For example, one of the switches may be physically disabled, for example by physical removal or by cutting an unused line in order to sever the connection to the switch.

Furthermore, a trimming capacitor may additionally be added across the antenna to precisely tune the operating frequency of the antenna 208, 308, 408. Those skilled in the art will understand the difference between a tuning capacitor and a trimming capacitor, for example a trimming capacitor may vary the frequency of the antenna 208, 308, 408 by less than 10%, and preferably less than 5%.

Whilst the above discussions relates to a semi-passive biometric device 202, 302, 402 in which the fingerprint authentication engine 220, 320, 420 is powered by a battery 222, 322, 422, it will be understood that any or all of the arrangements described herein could alternatively be implemented using a passive fingerprint authentication engine 220, 320, 420, which is powered using the voltage induced in the antenna 208, 308, 408, i.e. without the use of a battery 222, 322, 422.

The invention claimed is:

1. A method of manufacturing biometric RFID devices, the method comprising:
    producing a plurality of biometric identification devices that are each adapted to receive an RFID module comprising an RFID chip and a tuning capacitor, each biometric identification device comprising:
        a device body housing a biometric authentication engine;
        an antenna within the device body; and
        a socket arranged to receive an RFID module;
    the method further comprising, for each biometric identification device:
        selecting an RFID protocol from a plurality of different RFID protocols; and
        installing, in the socket of the biometric identification device, an RFID module corresponding to the selected RFID protocol.

2. A method according to claim 1, wherein the method includes selecting different protocols for different devices and installing different modules for different devices in the plurality of devices.

3. A method according to claim 1, wherein the step of selecting the RFID protocol is performed after the step of producing the corresponding biometric identification device.

4. A method according to claim 1, comprising:
    selecting a first RFID protocol from the plurality of different RFID protocols for a first biometric identification device and installing a corresponding RFID module in the first biometric identification device; and
    selecting a second RFID protocol from the plurality of different RFID protocols for a second biometric device, the second RFID protocol being different from the first RFID protocol, and installing a corresponding RFID module, in the second biometric identification device.

5. A method according to claim 4, wherein each biometric identification device includes multiple sets of terminals, with each set of terminals being arranged for operation with a different type of RFID module.

6. A method according to claim 5, wherein the multiple sets of terminals include a first set of terminals for operation with a first RFID module and a second, different set of terminals for operation with a second RFID module, wherein the first RFID module operates at a first frequency and the second RFID module operates at a second frequency, the second frequency being different from the first frequency.

7. A method according to claim 6, wherein the first frequency is higher than the second frequency, and wherein the biometric authentication engine is configured to activate an RFID module connected to the first set of terminals using a switch coupled in series with the antenna, and to active an RFID module connected to the second set of terminals using a switch coupled in parallel with the antenna.

8. A method according to claim 6, wherein the first RFID protocol operates at 13.56 MHz and the second RFID protocol operates at 125 kHz.

9. A method according to claim 1, wherein the biometric identification device does not include a battery configured to power an RFID module installed in the socket.

10. A method according to claim 1, wherein all of the at least one biometric identification devices are structurally identical before installation of an RFID module.

11. A method according to claim 1, wherein the biometric authentication engine is a fingerprint authentication engine.

12. A biometric identification device for receiving an RFID module comprising an RFID chip and a tuning capacitor, the biometric identification device comprising:
    a device body housing a biometric authentication engine;
    an antenna within the device body; and
    a socket arranged to receive an RFID module, the socket including terminals adapted to alternatively receive a first type of RFID module complying with a first RFID protocol or a second type of RFID module complying with a second RFID protocol, the second RFID protocol being different from the first RFID protocol.

13. A biometric identification device according to claim 12, comprising a switch controllable by the biometric authentication engine for activating an RFID module when connected to the terminals.

14. A biometric identification device according to claim 13, wherein the switch is arranged in series with the antenna.

15. A biometric identification device according to claim 13, wherein the switch is arranged in parallel with the antenna.

16. A biometric identification device according to claim 12, wherein the terminals include at least first set of terminals and a second sets of terminals within the socket, the first set of terminal being arranged to receive the first type of RFID module, and the second set of terminal having a different configuration to the first set of terminals and being arranged to receive a second type of RFID module.

17. A biometric identification device according to claim 16, comprising:
    a first switch arranged in series with the antenna and controllable by the biometric authentication engine for activating a first type RFID module, when connected to the first set of terminals; and
    a second switch arranged in parallel with the antenna and controllable by the biometric authentication engine for activating a second type RFID module, when connected to the second set of terminals.

18. A biometric identification device according to claim 12, wherein the biometric authentication engine is configured to verify the identity of a user and responsive to a positive identification, cause an RFID module connected to the terminals to transmit a message using the antenna.

19. A biometric identification device according to claim 12, wherein the biometric authentication engine is a fingerprint authentication engine.

20. A set of biometric identification devices, each device being a biometric identification device according to claim 12, whereby individual devices from the set of devices are fitted with different types of RFID modules.

21. A set of biometric identification devices comprising multiple identical biometric identification devices with one group of the devices being fitted with a first type of RFID module and another group of the devices being fitted with a second type of RFID module.

* * * * *